United States Patent
Hanshew

(10) Patent No.: US 10,327,390 B2
(45) Date of Patent: Jun. 25, 2019

(54) FOOD STORAGE SYSTEM

(71) Applicant: Barbara Hanshew, Visalia, CA (US)

(72) Inventor: Barbara Hanshew, Visalia, CA (US)

( * ) Notice: Subject to any disclaimer, the term of this patent is extended or adjusted under 35 U.S.C. 154(b) by 122 days.

(21) Appl. No.: 15/590,074

(22) Filed: May 9, 2017

(65) Prior Publication Data

US 2018/0325034 A1    Nov. 15, 2018

(51) Int. Cl.
| | |
|---|---|
| *A01F 25/14* | (2006.01) |
| *A01F 25/12* | (2006.01) |
| *A47G 23/00* | (2006.01) |
| *A01F 25/00* | (2006.01) |
| *A23B 7/00* | (2006.01) |

(52) U.S. Cl.
CPC .............. *A01F 25/14* (2013.01); *A01F 25/12* (2013.01); *A47G 23/00* (2013.01); *A01F 25/00* (2013.01); *A23B 7/00* (2013.01)

(58) Field of Classification Search
CPC .......... A47J 36/20; A47J 43/24; A47J 43/284; A23L 7/161
USPC .......................... 99/323.5; 209/417, 733, 680
See application file for complete search history.

(56) References Cited

U.S. PATENT DOCUMENTS

| | | | | |
|---|---|---|---|---|
| 1,326,942 A | * | 1/1920 | Lochner | A47J 36/20 47/79 |
| 1,801,194 A | * | 4/1931 | Dovre | A47J 36/20 261/107 |
| 3,756,681 A | * | 9/1973 | Croston | B65D 81/262 220/592.01 |
| 4,351,444 A | | 9/1982 | Majewski | |
| 5,332,102 A | | 7/1994 | Sennett et al. | |
| 5,799,866 A | | 9/1998 | Hattem | |
| 6,135,307 A | | 10/2000 | Fahy | |
| 7,340,995 B2 | | 3/2008 | Chiang et al. | |
| D633,347 S | | 3/2011 | Boris | |
| 8,998,022 B2 | * | 4/2015 | Curtis | A47J 36/20 220/528 |
| 2009/0266748 A1 | * | 10/2009 | Boris | A47J 43/284 209/352 |
| 2014/0166668 A1 | | 6/2014 | Mallia | |

* cited by examiner

Primary Examiner — Patrick F Brinson

(57) ABSTRACT

A food storage system for enhancing freshness of a perishable food item includes a bowl that is positioned on a support surface. A plate is provided and the plate is selectively positioned in the bowl. The plate is perforated to pass air between the plate and the bowl. A food item is selectively positioned on the plate thereby facilitating the food item to be kept dry. In this way the plate inhibits the food item from rotting and the plate enhances freshness of the food item.

1 Claim, 3 Drawing Sheets

FOOD STORAGE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to storage devices and more particularly pertains to a new storage device for enhancing freshness of a food item.

BRIEF SUMMARY OF THE INVENTION

An embodiment of the disclosure meets the needs presented above by generally comprising a bowl that is positioned on a support surface. A plate is provided and the plate is selectively positioned in the bowl. The plate is perforated to pass air between the plate and the bowl. A food item is selectively positioned on the plate thereby facilitating the food item to be kept dry. In this way the plate inhibits the food item from rotting and the plate enhances freshness of the food item.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
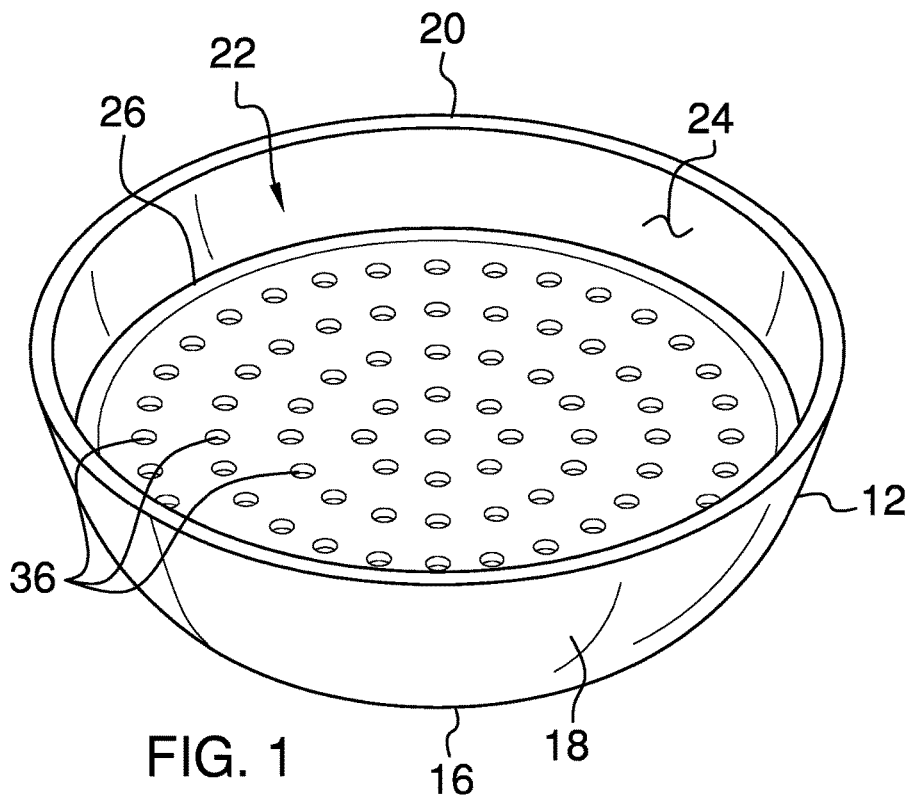
FIG. 1 is a top perspective view of a food storage system according to an embodiment of the disclosure.
Figure 2:
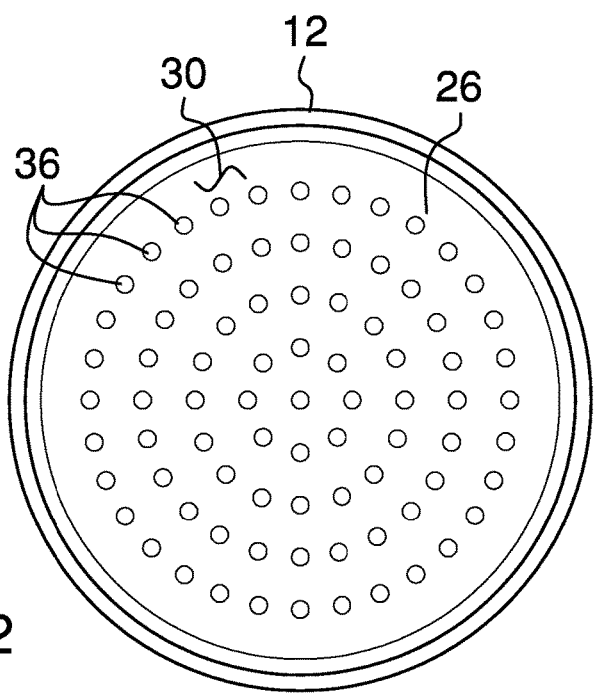
FIG. 2 is a top view of an embodiment of the disclosure.
Figure 3:
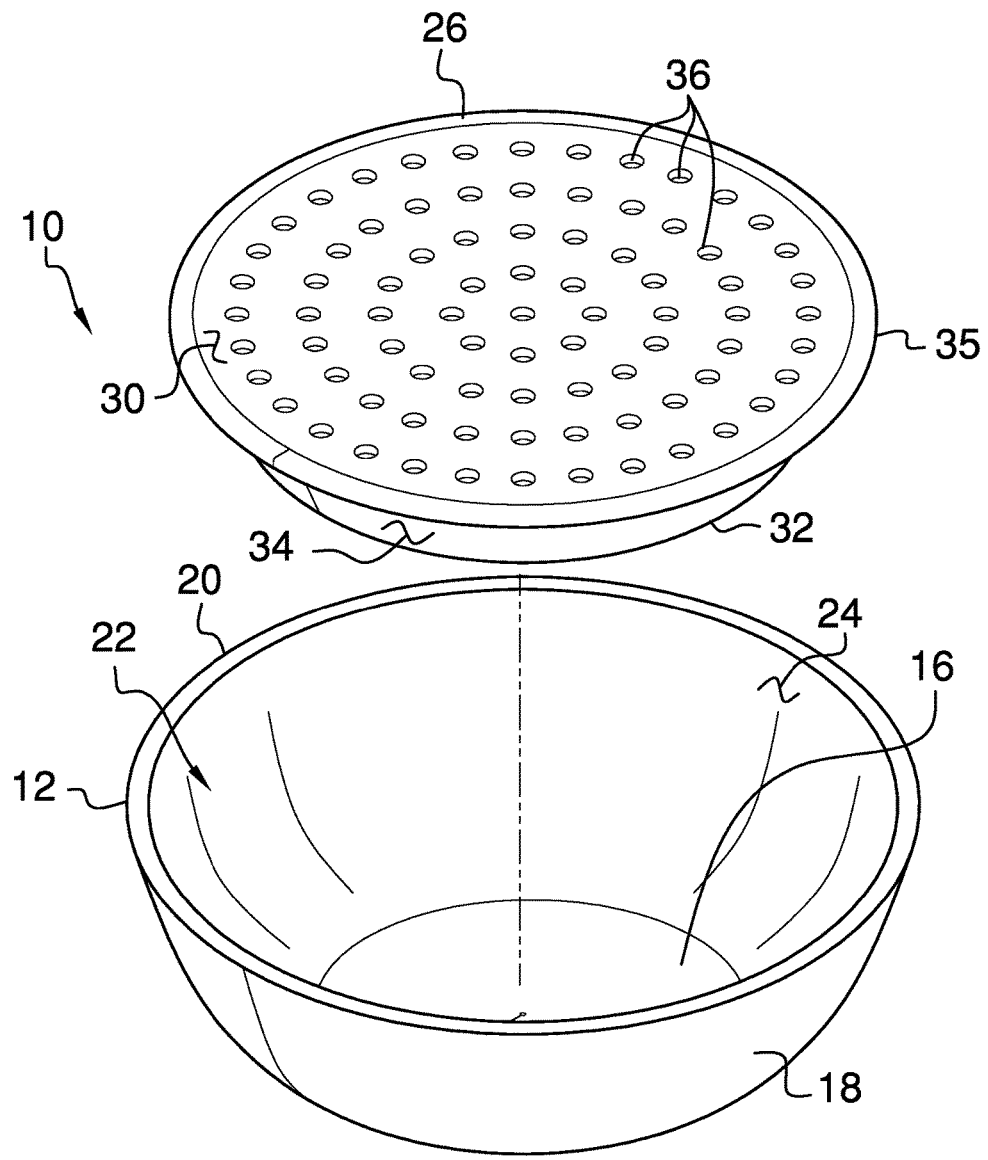
FIG. 3 is an exploded view of an embodiment of the disclosure.
Figure 4:
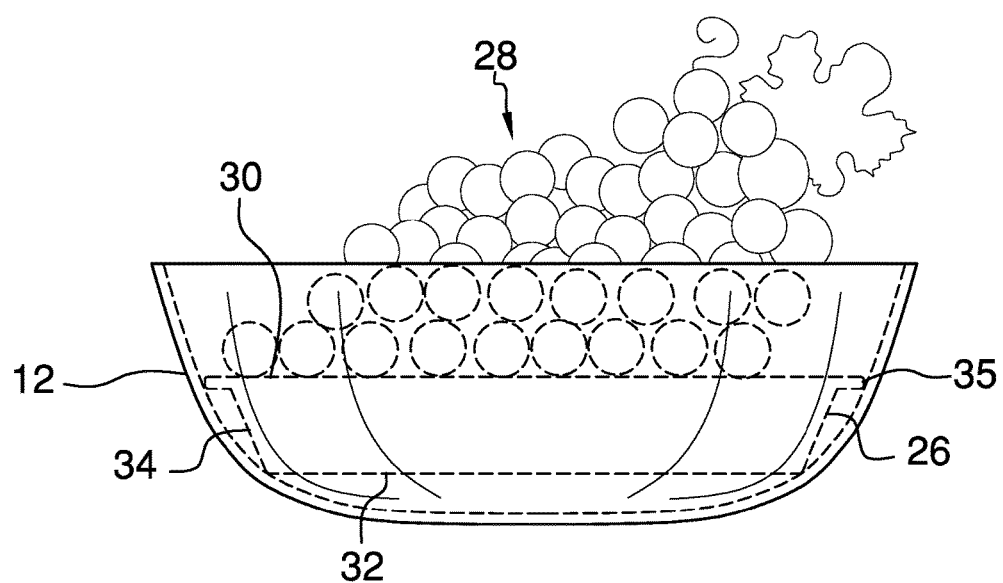
FIG. 4 is a perspective in-use view of an embodiment of the disclosure.

With reference now to the drawings, and in particular to FIGS. 1 through 4 thereof, a new storage device embodying the principles and concepts of an embodiment of the disclosure and generally designated by the reference numeral 10 will be described.

As best illustrated in FIGS. 1 through 4, the food storage system 10 generally comprises a bowl 12 that is selectively positioned on a support surface 14 such as a table top or the like. The bowl 12 has a bottom wall 16 and a perimeter wall 18 extending upwardly therefrom. The perimeter wall 18 has a distal edge 20 to define an opening 22 into the bowl 12 and the perimeter wall 18 has an inwardly facing surface 24. The bowl 12 may be a mixing bowl, a food bowl or any other type of bowl commonly found in a kitchen.

A plate 26 is provided and the plate 26 is selectively positioned in the bowl 12. The plate 26 is perforated to pass air between the plate 26 and the bowl 12. A food item 28 is selectively positioned on the plate 26 thereby facilitating the food item 28 to be kept dry. The food item 28 may be fresh fruit, fresh vegetables or other perishable food item 28.

The plate 26 has a top surface 30, a bottom surface 32 and an outer surface 34 extending therebetween. The outer surface 34 curves inwardly between the top surface 30 and the bottom surface 32. Moreover, the outer surface 34 frictionally engages the inwardly facing surface 24 of the bowl 12 when the plate 26 is positioned in the bowl 12. The bottom surface 32 is spaced from the bottom wall 16 and the top surface 30 is spaced from the distal edge 20 of the bowl 12 when the plate 26 is positioned in the bowl 12. Additionally, the top surface 30 may extended outwardly beyond the outer surface 34 to define a lip 35 extending around the plate 26.

The plate 26 has a plurality of apertures 36 extending through the top surface 30 and the bottom surface 32 to pass the air between the plate 26 and the bowl 12. The apertures 36 are spaced apart from each other and are distributed on the top surface 30. The food item 28 is positioned on the top surface 30 of the plate 26.

In use, the plate 26 is positioned in the bowl 12 and the food item 28 is positioned on the plate 26. In this way the food item 28 is inhibited from lying in the bowl 12 and the apertures 36 facilitate moisture from the food item 28 to drip through the plate 26. Additionally, the apertures 36 facilitate air the pass between the plate 26 and the bowl 12. In this way the food item 28 is kept dry to inhibit the food item 28 from rotting and to enhance freshness.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A food storage system comprising:

a bowl being configured to be positioned on a support surface, said bowl having a bottom wall and a perimeter wall extending upwardly therefrom, said perimeter wall having a distal edge to define an opening into said bowl, said perimeter wall having an inwardly facing surface; and a plate being selectively positioned in said bowl, said plate being perforated wherein said plate is configured to pass air between said plate and said bowl, said plate being configured to have a food item positioned thereon thereby facilitating the food item to be kept dry, said plate having a top surface, a bottom surface and an outer surface extending therebetween, said outer surface being arcuate such that said outer surface is tapered to curve inwardly extending from said top surface towards said bottom surface, a junction between a bottom edge of said outer surface and said bottom surface frictionally engaging said inwardly facing surface of said bowl when said plate is positioned in said bowl such that said bottom surface is upwardly spaced from said bottom wall of said bowl and having said top surface being downwardly spaced from said distal edge of said bowl, said top surface extending outwardly from an upper end of said outer surface defining a lip extending around said plate from said upper end of said outer surface, said lip frictionally engaging said inward facing surface between said bottom edge of said outer surface and said distal edge of said bowl.

\* \* \* \* \*